(12) United States Patent
Reitz et al.

(10) Patent No.: US 8,920,275 B2
(45) Date of Patent: Dec. 30, 2014

(54) HYBRID MODULE FOR A DRIVE TRAIN OF A VEHICLE

(71) Applicant: Schaeffler Technologies AG & Co. KG, Herzogenaurach (DE)

(72) Inventors: Dierk Reitz, Baden-Baden (DE); Willi Ruder, Lahr (DE); Matthias Schneider, Sasbach (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 13/923,632

(22) Filed: Jun. 21, 2013

(65) Prior Publication Data

US 2013/0281258 A1    Oct. 24, 2013

Related U.S. Application Data

(63) Continuation of application No. PCT/DE2011/002047, filed on Nov. 29, 2011.

(30) Foreign Application Priority Data

Dec. 21, 2010   (DE) .......................... 10 2010 055 275

(51) Int. Cl.
    *B60W 20/00*        (2006.01)
    *B60K 6/48*          (2007.10)
    *B60K 6/383*        (2007.10)

(52) U.S. Cl.
    CPC ............... *B60W 20/40* (2013.01); *B60K 6/383* (2013.01); *B60K 6/48* (2013.01); *B60K 2006/4825* (2013.01); *B60Y 2400/4242* (2013.01); *Y02T 10/6221* (2013.01); *Y02T 10/6252* (2013.01); *Y10S 903/902* (2013.01); *Y10S 903/913* (2013.01); *Y10S 903/914* (2013.01)
    USPC ............... 475/5; 475/8; 192/48.6; 180/65.25; 180/65.26; 903/913; 903/914; 903/902

(58) Field of Classification Search
    USPC .................................. 475/5; 180/65.25, 65.26
    See application file for complete search history.

(56) References Cited

U.S. PATENT DOCUMENTS

| | | | |
|---|---|---|---|
| 6,668,953 B1 | 12/2003 | Reik et al. | |
| 7,469,778 B2 * | 12/2008 | Groddeck et al. | ........... 192/48.3 |
| 8,601,893 B2 * | 12/2013 | Reisch et al. | .................. 74/335 |

(Continued)

FOREIGN PATENT DOCUMENTS

| | | |
|---|---|---|
| DE | 10036504 | 5/2011 |
| EP | 2050608 | 4/2009 |
| JP | 2008126703 | 6/2008 |

*Primary Examiner* — Edwin A Young
*Assistant Examiner* — Colby M Hansen
(74) *Attorney, Agent, or Firm* — Volpe and Koenig, P.C.

(57) ABSTRACT

A hybrid module for a drive train of a vehicle having an internal combustion engine and a transmission. The hybrid module operates between the internal combustion engine and the transmission and has an electric drive, a clutch, and a freewheel, and the clutch and the freewheel are provided parallel to each other in order to transmit torque from the internal combustion engine toward the transmission, the freewheel transmits torque coming from the internal combustion engine to the transmission and opens for torque directed in the opposite direction, and a portion of the torque produced by the internal combustion transmitted by the freewheel can be set by setting a torque that can be transmitted by the clutch so that the vehicle can be driven by the internal combustion engine or the electric drive or both at the same time.

12 Claims, 9 Drawing Sheets

(56) References Cited

U.S. PATENT DOCUMENTS

| | | |
|---|---|---|
| 2009/0166109 A1 | 7/2009 | Duan et al. |
| 2010/0087290 A1 | 4/2010 | Schoenek et al. |
| 2010/0314185 A1 | 12/2010 | Schoenek |
| 2011/0061954 A1* | 3/2011 | Singh et al. ............ 180/65.22 |

* cited by examiner

HYBRID MODULE FOR A DRIVE TRAIN OF A VEHICLE

INCORPORATION BY REFERENCE

The following documents are incorporated herein by reference as if fully set forth: PCT Application No. PCT/DE2011/002047, filed Nov. 29, 2011; and German Patent Application No. 102010055275.5, filed Dec. 21, 2010.

BACKGROUND

The present invention relates to a hybrid module for a drive train of a vehicle having an internal combustion engine and a transmission.

A hybrid drive train of a motor vehicle is known from DE 100 36 504 A1, which comprises an internal combustion engine, a two-weight freewheel, an electric drive, and a transmission, with a first separating clutch being arranged between the internal combustion engine and the electric drive and another separating clutch between the electric drive and the transmission. The first separating clutch arranged at the engine side serves to decouple the internal combustion engine from the remaining drive train, in order to drive the vehicle entirely electrically, for example. The second separating clutch arranged at the transmission side serves to start the internal combustion engine via the electric drive and during this starting process decouple the transmission. The electric drive and the two separating clutches may overlap axially and radially for reasons of construction space, as shown in FIG. 2 of DE 100 36 504 A1, by the first separating clutch being integrated in the rotor of the electric drive. However, this integration of the separating clutch arranged at the engine side in the rotor of the electric engine, usually necessary for reasons of technical construction space, leads to relatively small friction radii, though. Due to these smaller friction radii the moment that can be transmitted is reduced.

SUMMARY

Accordingly it is the objective of the present invention to increase the moment that can be transmitted by the hybrid module of the type mentioned at the outset with an essentially identical construction space required.

This objective is attained according to the invention in a hybrid module for a drive train of a vehicle with an internal combustion engine and a transmission, with the hybrid module acting between the internal combustion engine and the transmission and having an electric drive, a separating clutch, and a freewheel, and with the separating clutch and the freewheel respectively being parallel in reference to each other for transmitting the torque from the internal combustion engine in the direction towards the transmission, the freewheel transmits a torque originating in the internal combustion engine in the direction towards the transmission and opens for a torque exerted in the opposite direction, and a portion of the torque generated by the internal combustion engine and transmitted by the freewheel being adjustable by setting the torque that can be transmitted by the separating clutch so that the vehicle optionally can be driven by the internal combustion engine or the electric drive or combined simultaneously by both of them.

With the solution according to the invention here the function of the separating clutch at the engine side known from prior art is divided over two components arranged parallel in reference to each other in the (direction of) flow of the torque, namely a separating clutch and a freewheel. In an open separating clutch the entire torque generated by the internal combustion engine is transmitted via the freewheel to the transmission. Accordingly, the freewheel should be designed such that its transmitted torque is equivalent to the torque that can be generated by the internal combustion engine. The capacity of the separating clutch for transmitting torque may be selected considerably lower in the hybrid module according to the invention than the torque that can be generated by the internal combustion engine. For example, in a torque that can be generated by the internal combustion engine from 700 to 800 Nm the separating clutch can be designed for 100 Nm to 130 Nm, while the freewheel however should here be designed for 700 Nm to 800 Nm. When the separating clutch is partially closed the torque that accordingly can be transmitted by the separating clutch also reduces the torque transmitted by the freewheel. In other words, the entire torque generated by the internal combustion engine is divided between the freewheel and the separating clutch, according to the torque transmitted by the separating clutch (which in turn depends on an operating force of the separating clutch.)

Here, the separating clutch may remain closed and/or be held closed when the present drive train is operated by the internal combustion engine so that usually a division of the torque occurs to the clutch and the freewheel. Under certain circumstances it may here be advantageous, though, under the operation of the internal combustion engine, to open and/or keep open the clutch at least partially, e.g., using pull-up switching and/or push-up switching.

With the separating clutch according to the invention the torque can be transmitted in the direction of the internal combustion engine (the freewheel opens in this direction of transmission of the torque). Accordingly, in a closed separating clutch any starting of the internal combustion engine from the electric driving operations (for example at 80 to 130 Nm) as well as a transmission of a push moment can be realized in case of a battery being in the fully charged state (for example up to 90 Nm).

The hybrid module according to the invention therefore comprises, as described above, a separating clutch and a freewheel switched parallel in reference to each other, with the torque of the internal combustion engine can be transmitted in the direction of the drive train exclusively by the freewheel or jointly by the freewheel and the separating clutch, or if applicable exclusively by the separating clutch. Additionally, torque directed from the drive train in the direction to the internal combustion engine is exclusively transmitted via the separating clutch.

Advantageously the separating clutch is embodied as a "normally open" clutch, thus embodied open in its default position, and is pulled shut and/or pushed shut by a closing force. This is advantageous, here, in that the clutch in the present drive train is open 70% (of the time) in common operation of a vehicle equipped with such a hybrid module. The effectiveness of the actuator is accordingly better under such framework conditions in a "normally open" clutch than an in a "normally closed" clutch.

The alternating torque developing during the operation of an internal combustion engine can be compensated via a damping device, such as a two-weight flywheel, arranged between the internal combustion engine and the hybrid module.

Additional preferred embodiments of the present invention are the described in detail below and in the claims.

BRIEF DESCRIPTION OF THE DRAWINGS

In the following the present invention is explained in greater detail using preferred exemplary embodiments in connection with the corresponding figures. Shown are.

DETAILED DESCRIPTION FOR THE PREFERRED EMBODIMENTS

Figure 1:
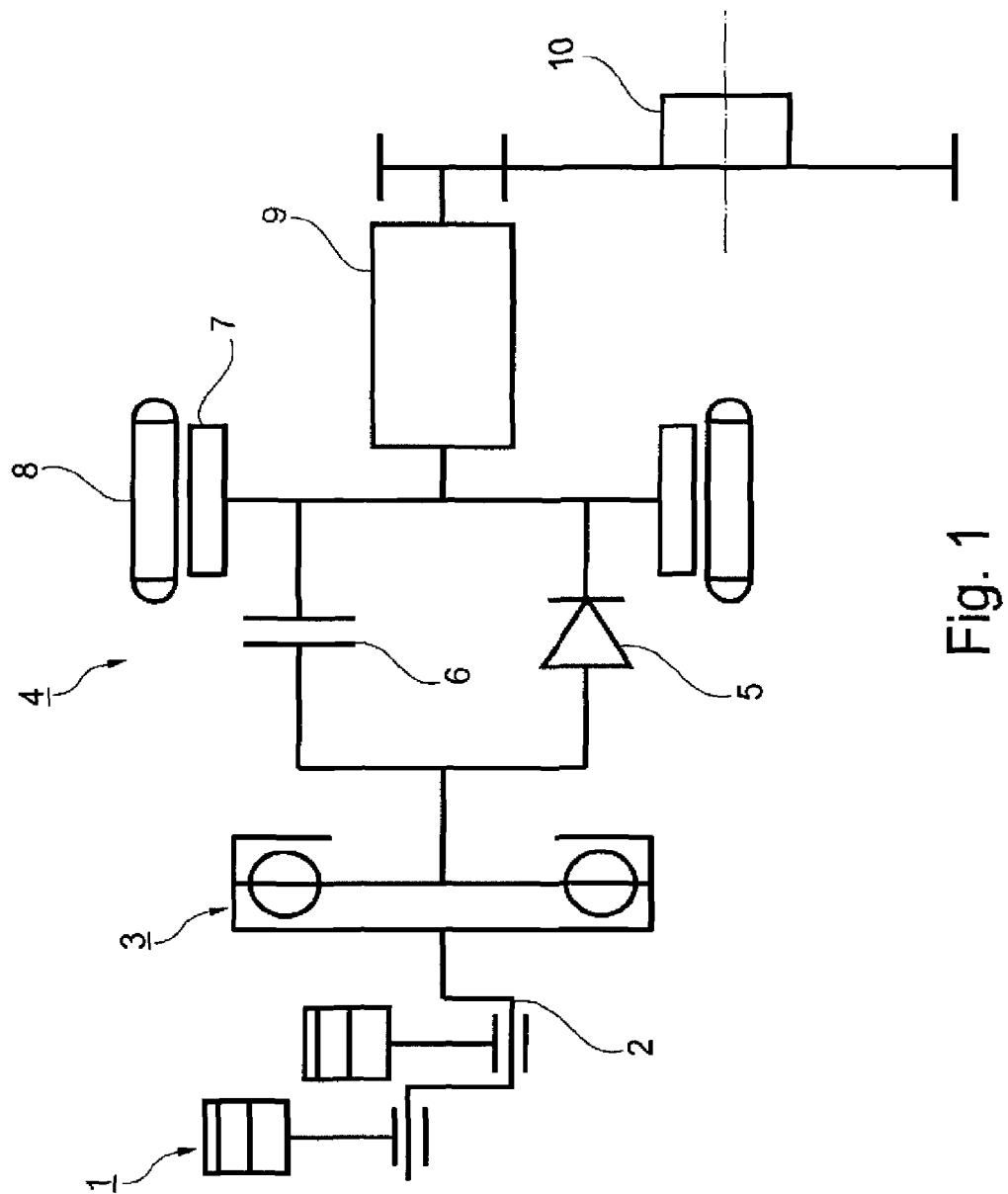
FIG. 1 is a schematic illustration of a drive train of a vehicle with the present hybrid module.

FIG. 1 shows schematically a drivetrain of a vehicle with an internal combustion engine 1, an oscillation damper connected to a crankshaft 2 of the internal combustion engine 1 (in the present example a two-weight flywheel), a hybrid module 4 with a freewheel 5 and a separating clutch 6, as well as with a rotor 7 and a stator 8 of an electric drive, a transmission 9, a differential 10, and driven wheels, not shown in greater detail.

FIG. 1 is here only to be understood as an example. For instance, the internal combustion engine 1 according to the illustration of FIG. 1 comprises "only" two cylinders. The present invention is not limited to such a concrete number of cylinders, though. Rather, more than two cylinders for the internal combustion engine 1 or also a parallel or serial arrangement of several internal combustion engines are possible. Additionally, FIG. 1 shows a two-weight flywheel. Alternatively here a one-weight flywheel or another type of oscillation damper may be used, such as a weight or centrifugal pendulum or a combination of such damping elements. Depending on the smooth operation of the internal combustion engine or engines, if applicable, such a damping unit may also be waived. In FIG. 1 additionally a six-gear (automatic) transmission is shown as the transmission, without the present invention being limited thereto. Rather, the embodiment of the transmission as an automatic transmission/geared transmission/CVT-transmission, or any other type of transmission, such as shift-crank transmission, if applicable also in connection with another separating unit between the transmission and the electric drive 7, 8 is possible (such as a torque converter, another separating clutch, or similar components).

It is discernible in FIG. 1, particularly with regards to the present hybrid module, that two parallel torque transmission trains are provided between the internal combustion engine 1 and the transmission 9, a first one with the separating clutch 6 and a second one with the freewheel 5, so that the functions of the separating clutch at the engine side known from prior art are divided over two components separate from each other. This way, the moment generated by the internal combustion engine 1 is divided over the separating clutch and the freewheel, depending on an operating force applied at the clutch.

As discernible from FIG. 1 the freewheel transfers torque when torque is transmitted from the internal combustion engine 1 to the transmission 9 and opens when the direction of the torque flow is from the transmission 9 to the internal combustion engine 1. The torque of the transmission 9 can be transmitted in the direction to the internal combustion engine 1 when the clutch is closed. This particularly relates to the starting function of the combustion engine from electric driving operation as well as the transfer of the propulsion moment in case of a fully charged battery.

When the drivetrain in operated by the internal combustion engine the separating clutch generally remains closed so that it transmits the moment transmitted by the internal combustion engine according to the given torque transmission capacity at least prorated together with the freewheel.

Figure 2:
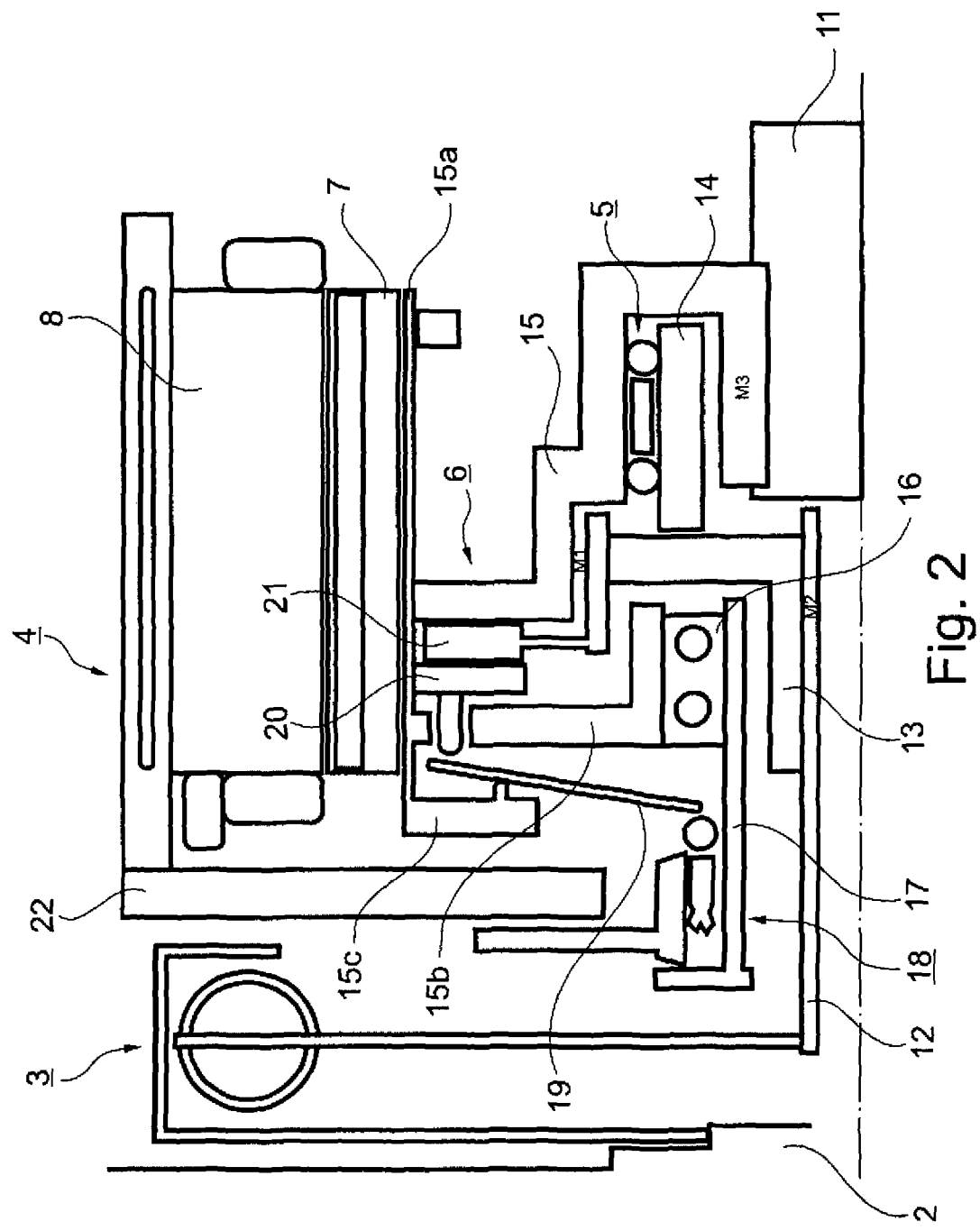
FIG. 2 is a view of an exemplary embodiment of the present hybrid module, in which the freewheel is arranged axially next to the central bearing, and in which an internal ring of the freewheel simultaneously performs the connection to the clutch disk as well as to the two-weight flywheel, and in which an external cage of the freewheel is connected to the transmission input.

A first constructive design of the diagram shown in FIG. 1 is discernible from FIG. 2, which shows the hybrid module 4 between the two-weight flywheel ("ZMS") 3 and a transmission input shaft 11 of the transmission 9 as a cross-section, with an outlet side of the ZMS 3 being connected to a central component 13, in the present example via an axial spline M2. The entire torque generated by the internal combustion engine 1 is accordingly transmitted via the ZMS 3 and the intermediate shaft 12 to the central component 13 of the hybrid module. The central component 13 is connected to an internal ring 14 of the freewheel 5 and/or a part of the central component 13 (for example a sheath-like projection) is embodied directly as an internal ring 14 of the freewheel. An external ring of the freewheel 5 is connected to a clutch housing 15 of the separating clutch 4 and/or a part of the clutch housing 15 is directly embodied as an external ring and/or as an external cage of the raceway. The clutch housing 15 is preferably connected via another axial spline M3 to a transmission input shaft 11 of the transmission 9, with another separating clutch (for example a converter or another friction clutch) may be arranged between the clutch housing and the transmission input shaft.

The clutch housing 15 furthermore comprises a cylindrical part 15a, which simultaneously represents a part of the rotor 7 of the electric drive 7, 8. In the given case the permanent magnets of the rotor are directly fastened at the cylindrical part 15a of the clutch housing.

The clutch housing 15 further comprises a radially extending area 15b, which is connected at a radially external section to the cylindrical part 15a, and which shows a sheath-like section in a radially internal section supported on a central bearing 16.

The central bearing 16 in turn is arranged at a housing 17 of the operating device 18 of the separating clutch 6 and/or at a sheath-like component 17, on which the operating device can be supported.

In the present case, the operating device 18 comprises a hydraulic operating unit with a hydraulic cylinder arranged concentrically in reference to the shaft 12, which operates an elastic lever 19 supported on another radially extending section 15c of the clutch housing 15 of the separating clutch 6 and which can impinge a compression plate 20 in the axial direction with an operating force according to the position of the operating cylinder.

According to an axial shift of the compression plate 20, a clutch disk 21 is clamped between the compression plate 20 and the clutch housing of the separating clutch 6, thus allowing the separating clutch 6 to be closed.

The clutch disk 21 of the separating clutch 6 is connected via the axial spline M1 to the central component 13 in a torque-proof fashion.

The operating unit 18 is fastened at the transmission housing 22.

As shown in FIG. 2, the central bearing 16 (in the present case embodied as a fixed bearing) can essentially be arranged axially next to the freewheel 5 (thus on a similar diameter), with an internal ring of the freewheel performing the connection to the clutch disk as well as the two-weight flywheel (via the central component 13) and with an external cage of the freewheel 5 being connected via the clutch housing 15 to the transmission input.

Figure 3:
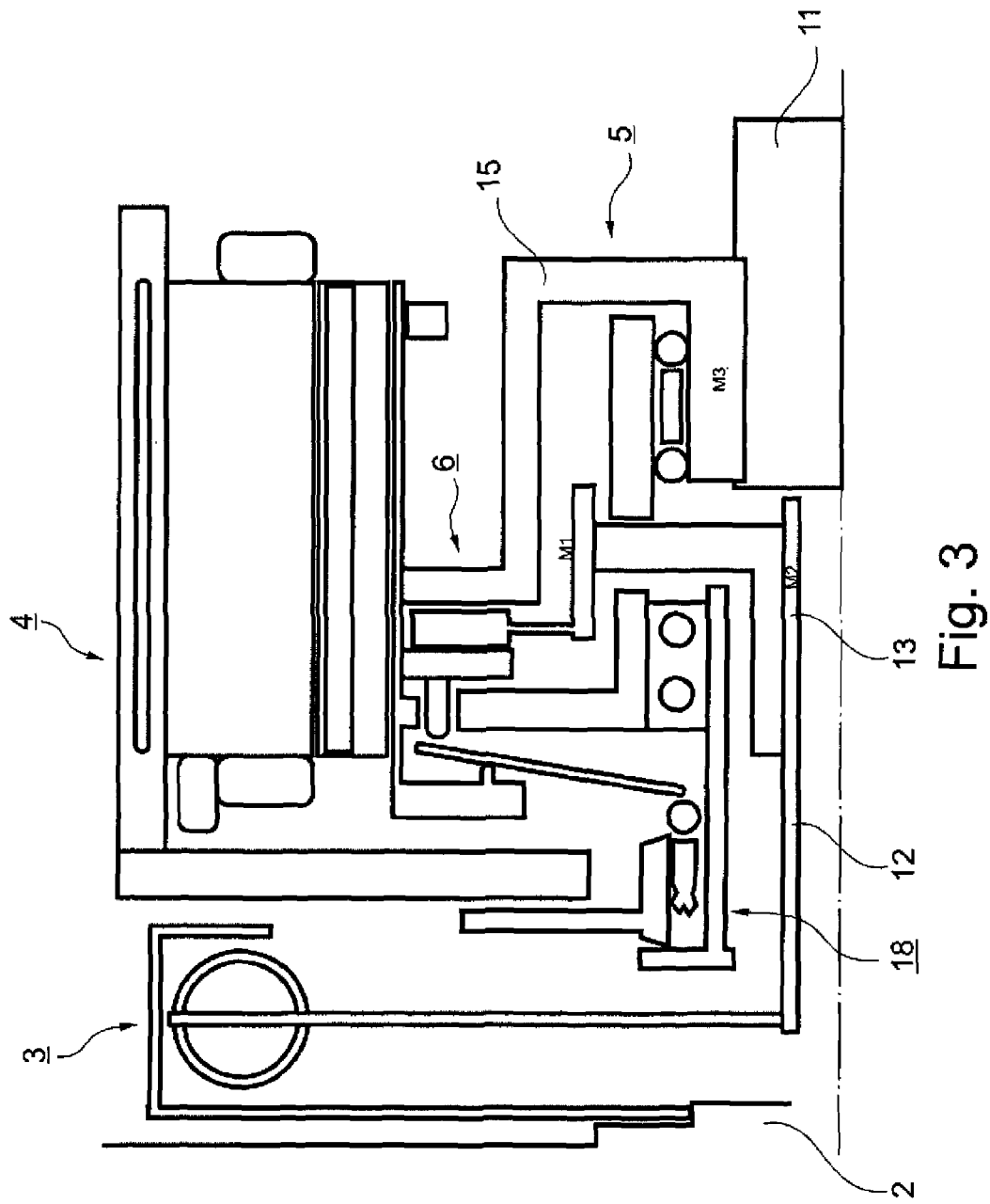
FIG. 3 is a view of another exemplary embodiment of the present hybrid module, in which the connection of the internal and the external ring at the freewheel is reversed in reference to the exemplary embodiment according to FIG. 2.

FIG. 3 shows another exemplary embodiment of the hybrid module which differs from the exemplary embodiment according to FIG. 2 only with regards to the arrangement of the freewheel and the embodiment of the clutch housing 15 and the central component 13 necessary, here. The other features are identical to the above-described exemplary embodiment according to FIG. 2. Thus, in the exemplary embodiment according to FIG. 3 the connection of the internal and the external ring at the freewheel are exchanged, with additionally the external ring of the freewheel 5 being a component of the central component 13 and the internal ring of the freewheel 5 being a component of the clutch housing 15.

A selection of the arrangement according to FIG. 2 or according to FIG. 3 can be made depending on the optimization of the drag torque as well as depending on the blocking function at high rotations.

The exemplary embodiments according to FIGS. 2 and 3 have in common that the freewheel 5 and the central bearing 16 are essentially arranged on a similar diameter. When additionally the axial positions of the freewheel 5 and the central bearing 16 are similar in reference to each other these two components can also be combined to one structural unit.

Figure 4:
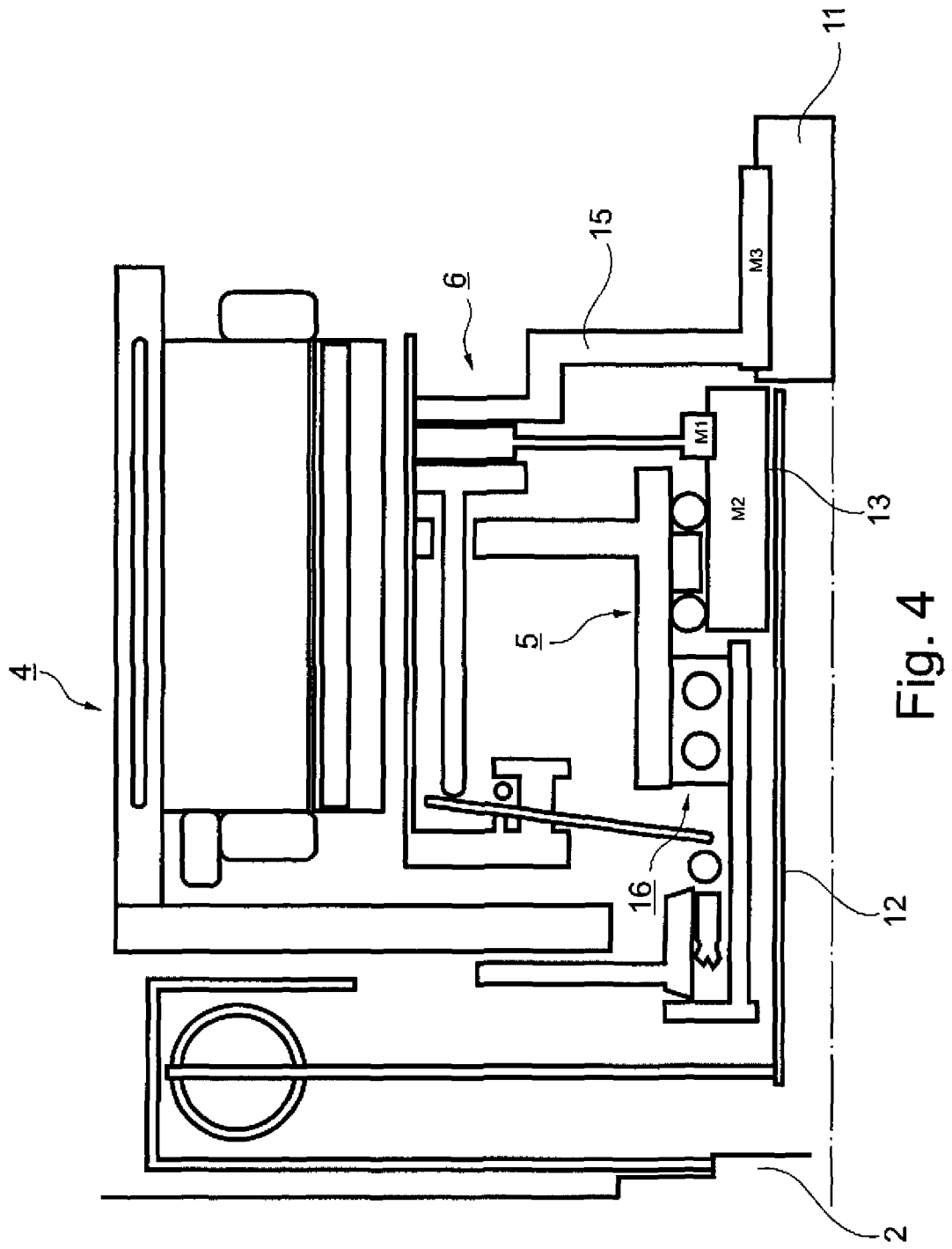
FIG. 4 is a view of an exemplary embodiment of the hybrid module, in which the central bearing and the freewheel are combined to one axial unit.

Such an embodiment with a component comprising a central bearing and a freewheel is shown schematically in FIG. 4, with the sections to be sealed being shown by arrows included in FIG. 4. Compared to the exemplary embodiments according to FIGS. 2 and 3 here any sealing can be omitted. Here, only 3 seals are necessary. Additionally the embodiment of the central component 14 can be simplified in the exemplary embodiment according to FIG. 4 compared to the exemplary embodiments according to FIGS. 2 and 3.

Figure 5:
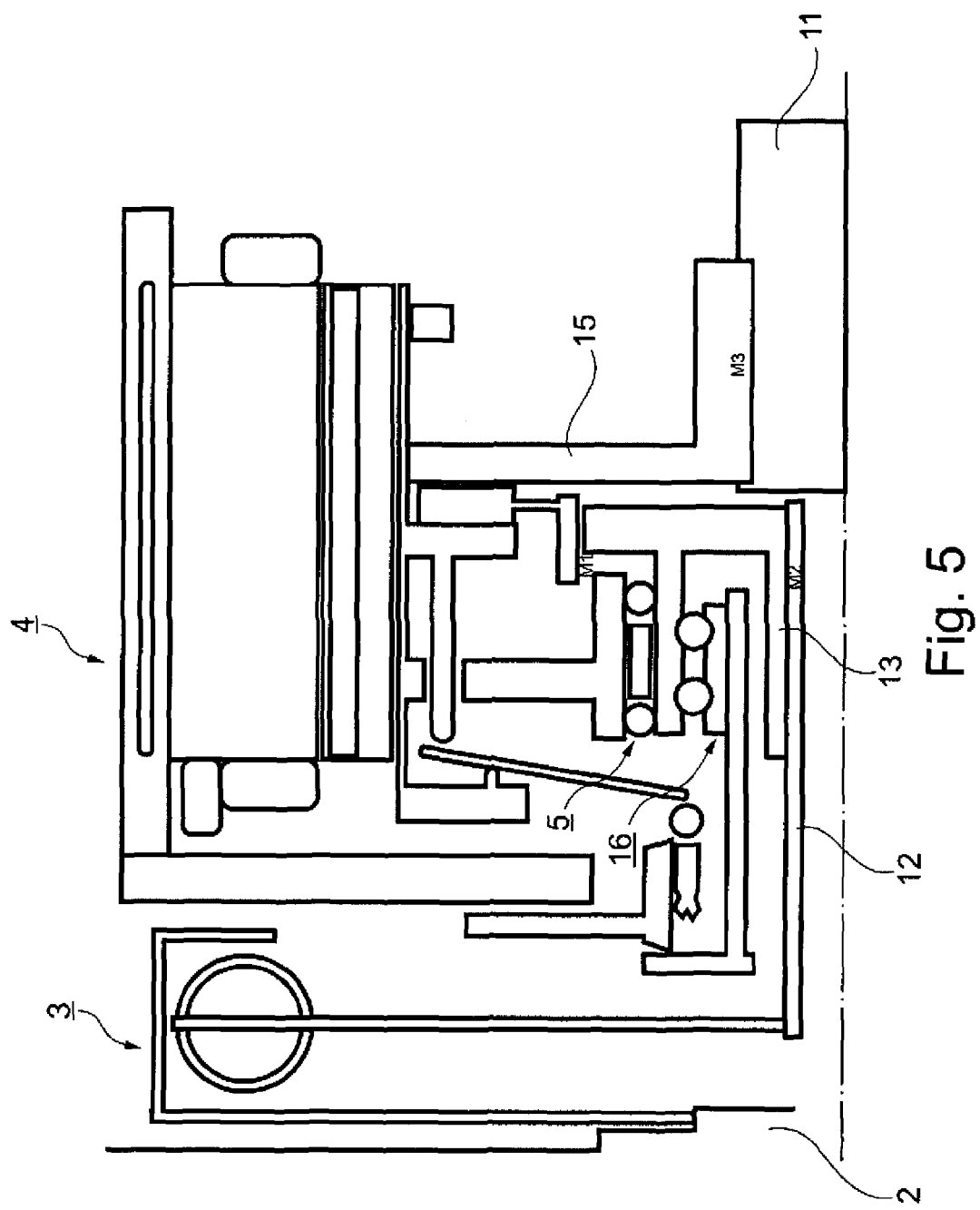
FIG. 5 is a view of another exemplary embodiment of the hybrid module with a first type of radial nesting of the central bearing and the freewheel, in which the central bearing and the freewheel are combined to a radial unit.

FIG. 5 shows another exemplary embodiment of the hybrid module 4, in which the central bearing 16 and a freewheel 5 are arranged radially nested. Furthermore, the central component 13 is embodied such that it simultaneously forms an external ring of the central bearing 16 and an internal ring of the freewheel 5, once more in order to form a unit comprising a central bearing and a freewheel. Again, the seals still required in FIGS. 2 and 3 can be omitted here.

Figure 6:
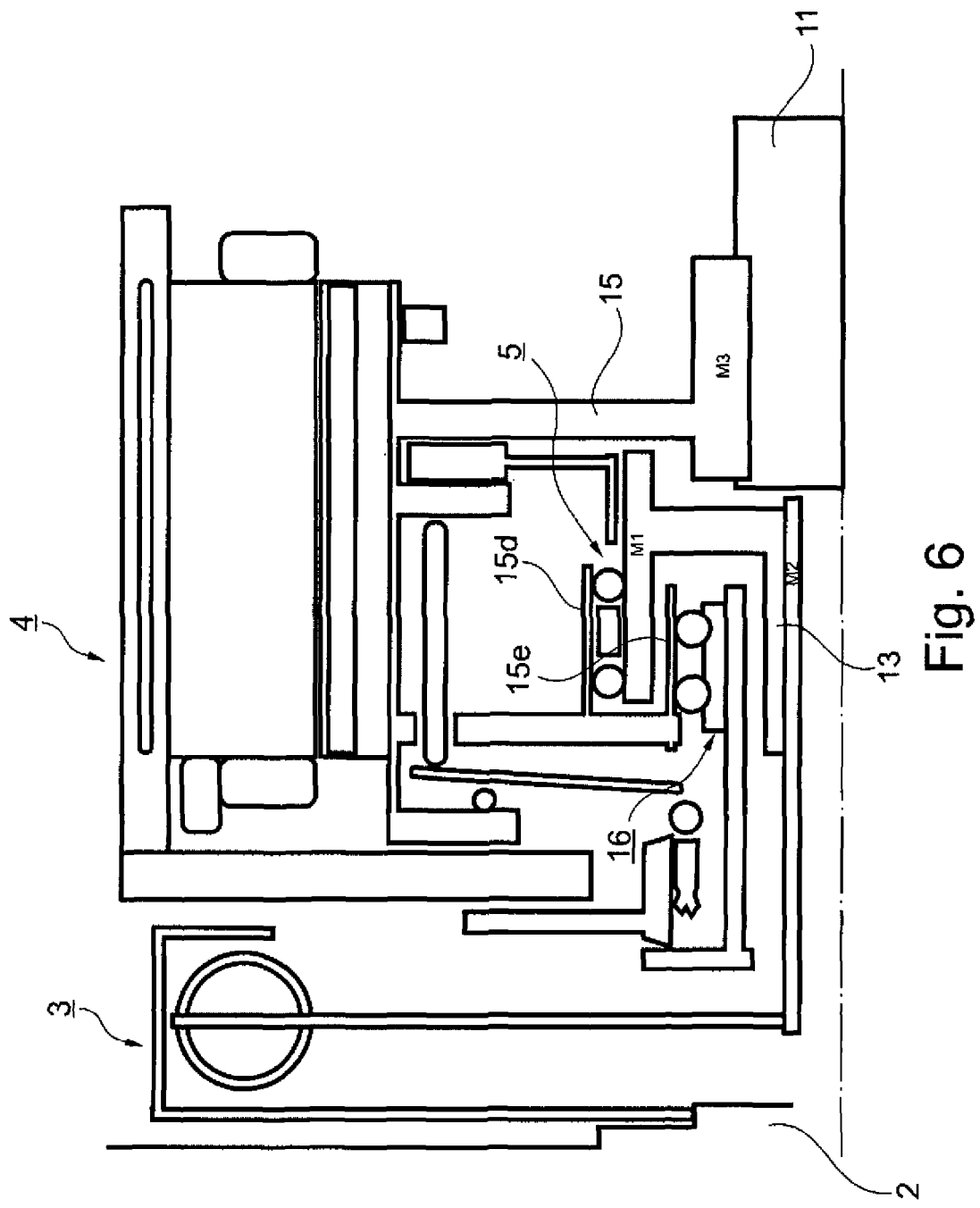
FIG. 6 is a view of another exemplary embodiment of the hybrid module with another type of radial nesting of the freewheel and the central bearing.

FIG. 6 shows another option of a radial nesting of the freewheel 5 and the central bearing, with in the present case an internal ring of the freewheel 5 being embodied integral with the central component 13, and with the clutch housing 15 comprising a sheath-like section 15d, at which an external ring of the freewheel 5 is arranged and/or embodied. An external bearing ring of the central bearing 15 may be arranged and/or embodied opposite at another sheath-like section 15e of the clutch housing 15.

Figure 7:
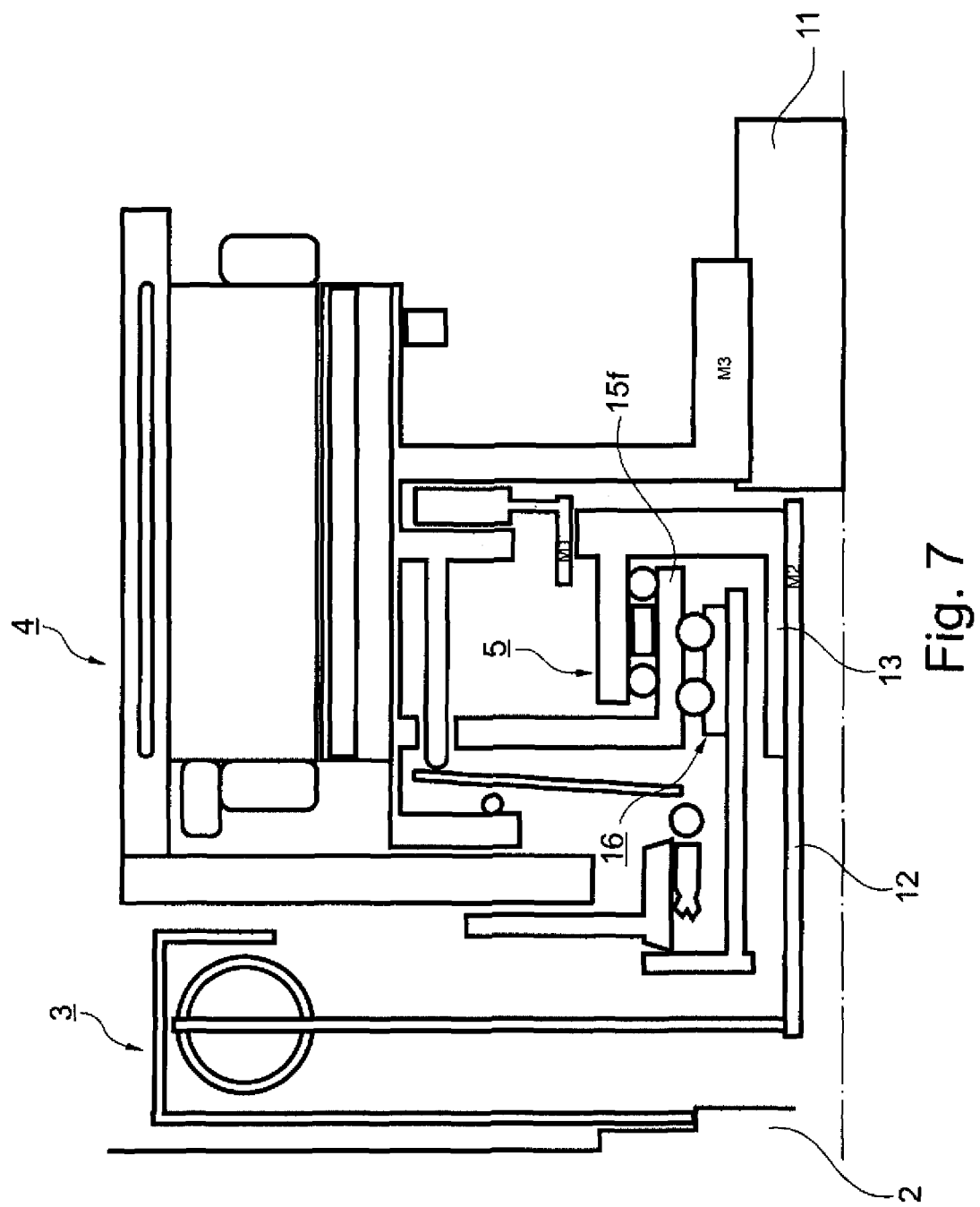
FIG. 7 is a view of another exemplary embodiment of the hybrid module with another type of radial nesting and a combination of the freewheel and the central bearing.

FIG. 7 shows another exemplary embodiment of the hybrid module, with the freewheel 5 and the central bearing 16 once more being arranged nested, and with the clutch housing 15 showing a sheath-like section 15f, at which an external bearing ring of the bearing 16 and an internal ring of the freewheel 5 are arranged and/or embodied. Once more, the areas to be sealed are indicated via arrows in FIG. 7.

It is also discernible particularly from the exemplary embodiments according to FIGS. 5 through 7 to radially nest the central bearing and the freewheel, with another combination of these components may occur such that the external bearing ring and the internal freewheel ring or vice versa being combined to one unit, with respectively only 3 seals being required here, compared to 4 seals in separate embodiments.

Figure 8:
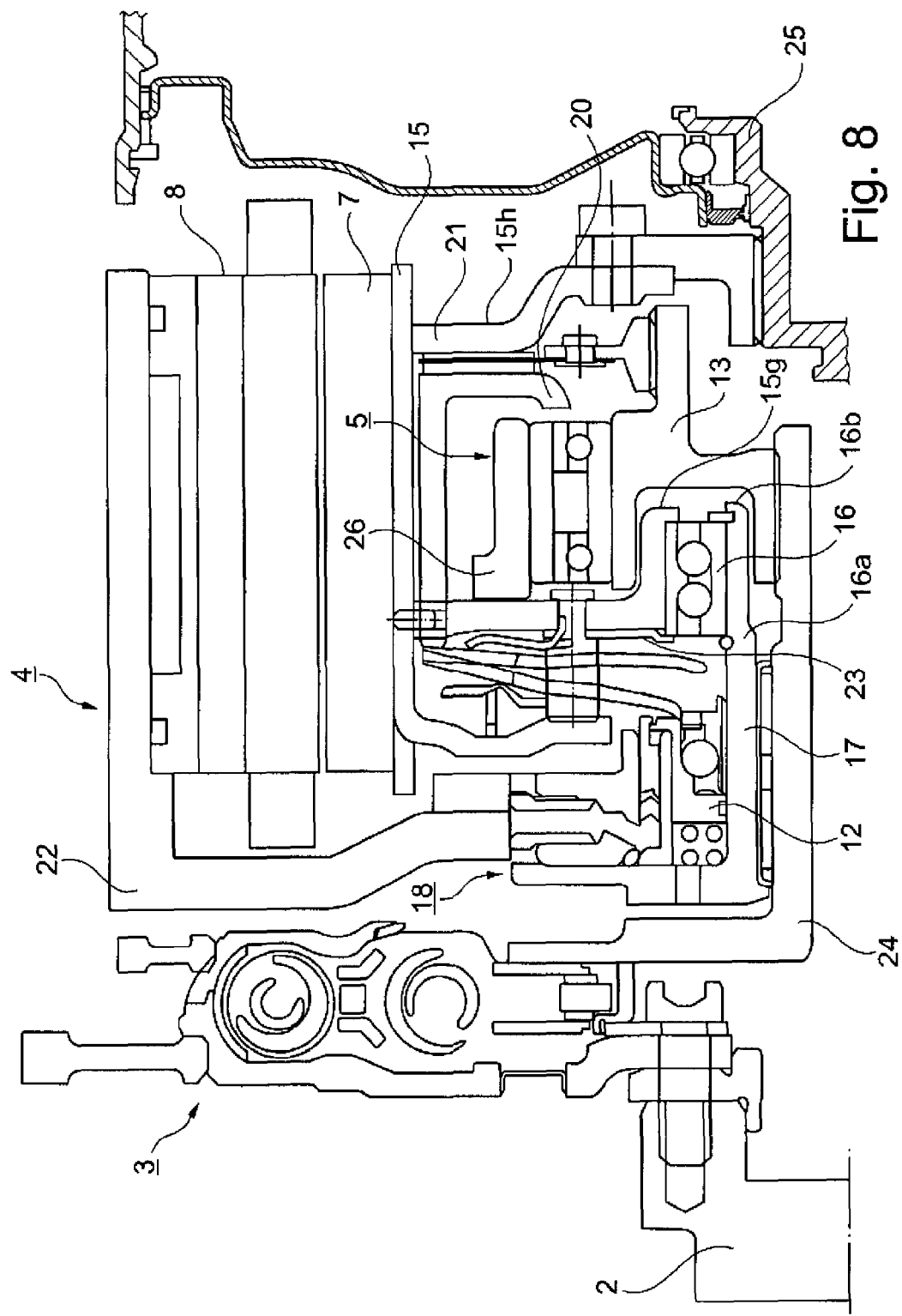
FIG. 8 is a view of another exemplary embodiment of the hybrid module, shown between the crankshaft and the connector to another clutch device arranged at the transmission side, which is based on the exemplary embodiment shown schematically in FIG. 6, FIG. 9A-9D are views of several exemplary embodiments of a bearing and freewheel group for the hybrid module.

FIG. 8 shows another exemplary embodiment of the hybrid module 4, with the torque coming from the crankshaft 2 via the ZMS 3 (embodied in the present case with an internal centrifugal force—pendulum) being transmitted to the intermediate shaft 12 (which is fastened at the secondary flange of the ZMS and/or embodied integral therewith). The intermediate shaft 12 is supported rotational via a radial bearing at a housing component 17 and/or at a flange component 17. The central bearing 16 is also arranged at the flange component 17, which central bearing is embodied as a fixed bearing between the flange component 17 and the clutch housing 15. Accordingly, an internal bearing ring of the central bearing 16 is fixed via a ring element 16a and a safety ring 16b and an external bearing ring of the central bearing 16 is fixed via a flange section 15g of the clutch housing 15 in connection to a cover plate 23. The flange component 17 is connected to the transmission housing 22 and may be a component of the housing of the operating device 18. In the present case the operating device 18 is embodied as a hydraulic operating unit with a central cylinder arranged coaxially in reference to the intermediate shaft 12 and an operating piston, in the present case semi-connected. In this case semi-connected means that an axial play between the operating piston and the operating bearing 24 is provided in order to avoid impacts when the clutch is operated.

The illustration according to FIG. 8 also includes the two extreme positions of the elastic lever 19, thus a rear position of the operating bearing 24 and a front position of the operating bearing 24.

The clutch housing in turn carries the rotor 7 of the electric drive unit and/or is rotationally connected therewith. The clutch housing 15 is additionally connected via a radial section 15h to another intermediate shaft 25, with also a contact area being provided at the section 15h for the clutch disk 21, which can be clamped between this section 15h and the compression plate 20.

The hub of the clutch disk 21 is here connected via an axial spline to the central component 13.

The central component 13 is additionally connected to the internal ring of the freewheel 5, with an external ring of the freewheel 5 being connected via an intermediate component 26 to the clutch housing 15.

Once more, an axial spline is provided between the clutch housing 15 and the intermediate shaft 25. The intermediate shaft 25 can be connected via another clutch unit and/or directly to the transmission.

Figure 9:
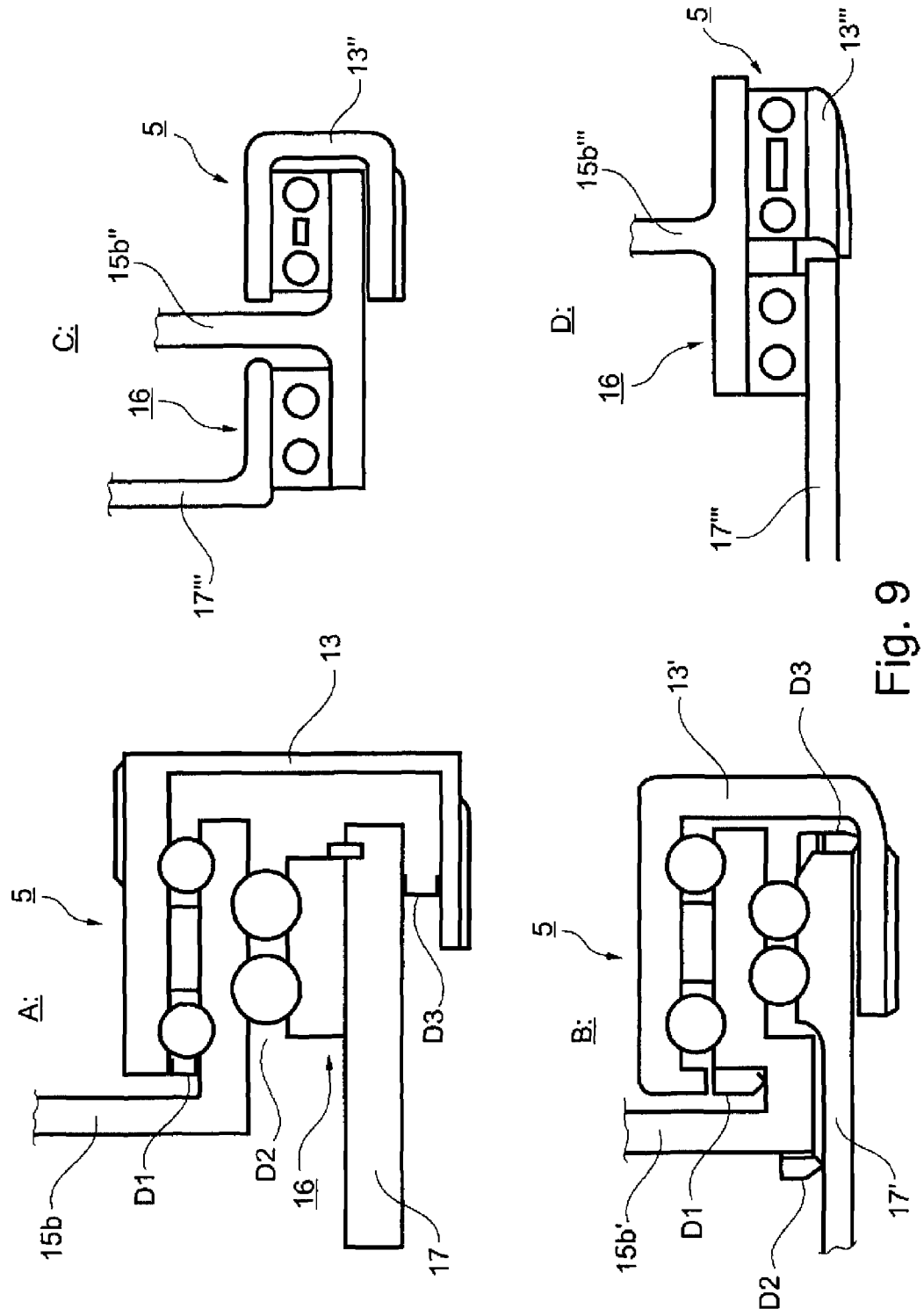

In FIG. 9 different variants of a combination of freewheel and central bearing are shown, with a radial nesting being shown according to FIG. 5 as example A and with the seals D1, D2, and D3 being shown used for sealing.

In the area B of FIG. 9 another option of the radial nesting is shown, with the internal bearing ring of the central bearing being embodied integral with a flange component 17', and with the central component 13' being embodied with a stop in order to generate a gap ring for the clutch housing section 158'. Once more the seals D1, D2, and D3 are here shown in slightly modified arrangements.

In the sections C and D of FIG. 9 two options are shown of an axial formation of components comprising a central bearing 16 and a freewheel 5.

LIST OF REFERENCE CHARACTERS

1 Internal combustion engine
2 Crankshaft
3 ZMS
4 Hybrid module
5 Freewheel
6 Separating clutch
7 Rotor
8 Stator
9 Transmission
10 Differential
11 Transmission input shaft
12 Intermediate shaft
13 Central component
13' Central component
14 Internal ring
15 Clutch housing
15A Cylindrical part
15B Radial extending section
15B' Clutch housing section
15C Radially extending section
15D Sheath-like section
15E Sheath-like section
15G Flange section
15H Radial section
16 Central bearing
16A Ring element
16B Safety ring
17 Housing
18 Operating device
19 Elastic lever
20 Compression plate
22 Transmission housing
23 Cover plate
24 Operating bearing
25 Intermediate shaft
26 Intermediate component
D1 Seal
D2 Seal
D3 Seal
M1 Spline
M2 Spline
M3 Spline

The invention claimed is:

1. A drive train of a vehicle having an internal combustion engine and a transmission, with a hybrid module being effective between the internal combustion engine and the transmission and comprising an electric drive, a single separating clutch, and a freewheel, and with the separating clutch and the freewheel being provided parallel in reference to each other for respectively transmitting torque from the internal combustion engine in a direction towards the transmission, a flywheel transmitting torque coming from the internal combustion engine in the direction towards the transmission, and the flywheel opening in case of a torque transmitted in an opposite direction, and a portion of the torque generated by the internal combustion engine, transmitted by the freewheel, can be adjusted by setting the torque that can be transmitted by the separating clutch so that the vehicle optionally can be driven by the internal combustion engine or the electric drive or simultaneously combined by both the internal combustion engine and the electric drive, wherein the separating clutch comprises a clutch housing, which is connected with a transmission input shaft via a first torque-proof connection, and to which a rotor of the electric drive transfers a torque, with the freewheel being arranged in a torque flow between a crankshaft and the clutch housing, wherein the clutch housing is supported axially and radially at a transmission housing via a central bearing, and a hydraulic or pneumatic or electro-mechanic or electric operating unit is arranged to operate the separating clutch, and the central bearing being arranged on a housing of the operating unit, and an oscillating weight damper is arranged in the drive train between the internal combustion engine and the hybrid module.

2. The drive train according to claim 1, comprising a central component, which is connected torque-proof to the crankshaft and to a clutch disk of the separating clutch, and with the freewheel being arranged between the central component and the clutch housing.

3. The drive train according to claim 2, wherein the central component is connected via a second torque-proof connection to the crankshaft or a component connected thereto, and connected via a third torque-proof connection to a hub of the clutch disk of the separating clutch.

4. The drive train according to claim 1, wherein the separating clutch is arranged radially inside the rotor of the electric drive and axially at least partially overlapping the rotor of the electric drive.

5. The drive train according to claim 4, wherein the rotor of the separating clutch is connected torque-proof to the clutch housing or embodied integral with the clutch housing.

6. The hybrid module according to claim 1, wherein an output side of the oscillating weight damper is connected torque-proof to an intermediate shaft, and the intermediate shaft extends through the operating unit, and is supported via a radial bearing in a housing of the operating unit.

7. The hybrid module according to claim 6, wherein the intermediate shaft is connected to the central component via a second torque-proof connection.

8. The drive train according to claim 1, wherein the separating clutch is provided to transfer the torque in the direction towards the internal combustion engine when the torque is to be transmitted from the drive train in the direction towards the internal combustion engine.

9. The hybrid module according to claim 1, wherein the central bearing and the freewheel are at least one of axially or radially combined to form a unit.

10. The hybrid module according to claim 9, wherein the central bearing and the freewheel are arranged radially nested or axially adjacent.

11. The hybrid module according to claim 9, wherein the central bearing and the freewheel are radially combined to form the unit in which a running area of the bearing and a running area of the freewheel are combined in one unit.

12. The drive train according to claim 1, wherein the separating clutch is adapted to be closed in a default state.

* * * * *